INVENTOR.
William B. Menghini.

BY Fishburn and Gold
ATTORNEYS.

Oct. 4, 1960  W. B. MENGHINI  2,954,579
FRANKFURTER SKINNING APPARATUS
Filed Feb. 2, 1959  2 Sheets-Sheet 2
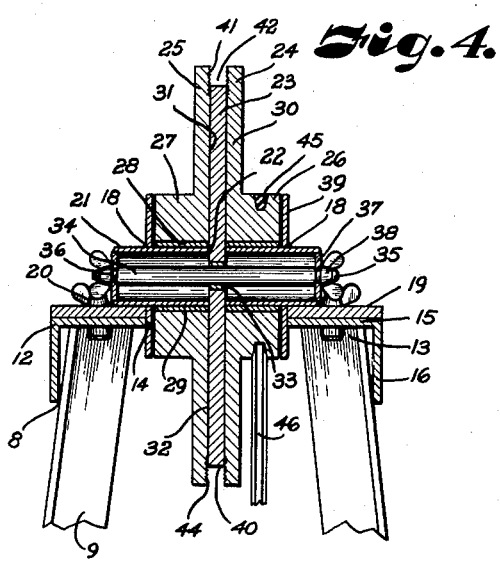
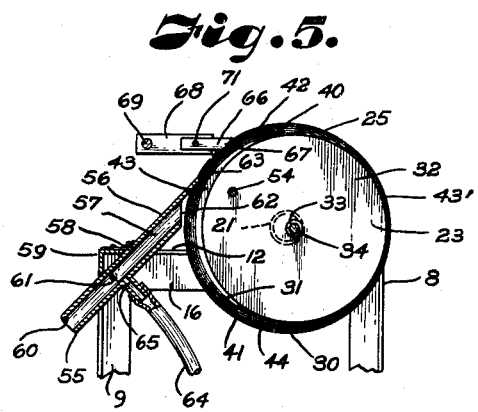
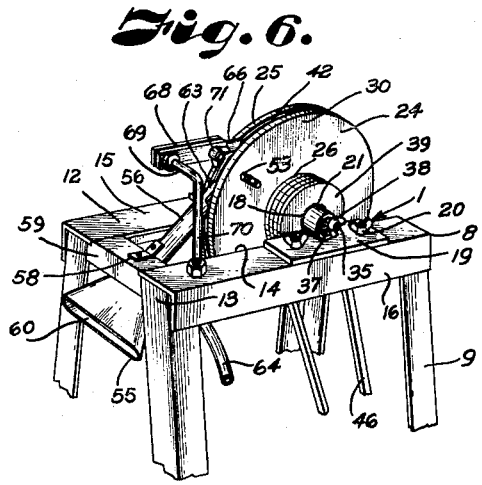
INVENTOR.
William B. Menghini.
BY
Fishburn and Gold
ATTORNEYS.

United States Patent Office 2,954,579
Patented Oct. 4, 1960

2,954,579

FRANKFURTER SKINNING APPARATUS

William B. Menghini, % Menghini Packing Company, Frontenac, Kans.

Filed Feb. 2, 1959, Ser. No. 790,527

5 Claims. (Cl. 17—1)

This invention relates to the preparation of skinless frankfurters, sausages and the like, and more particularly to apparatus for facilitating removal of casings from the frankfurters and like comestible products.

The manufacture of skinless frankfurters, sausages and the like wherein the meat filler is processed or treated while enclosed in temporary shape-retaining casing and then the casing removed generally consists of preparing the meat filler and charging the same to a stuffer from which it is extruded under pressure from a stuffing horn into suitable casings, as, for example, a long tube of cellulose such as plasticized cellophane, to produce a long string. Such a string is then passed through a suitable linking machine, or the casings twisted at spaced intervals or tied to form a plurality of links of desired lengths. The strings of linked frankfurters or the like are then placed on frames or supports, smoked at elevated temperatures, and then cooked in an atmosphere of water vapor, and then removed and chilled. It is common practice after such chilling to strip the casings from the frankfurters manually, or where the links are formed by ties to remove the ties and use air jets to strip the casings from the product.

The principal objects of the present invention are to provide an apparatus to mechanically remove the casing from the product and eliminate inherent disadvantages and time-consuming steps of the methods heretofore used; to provide apparatus for moving a string of linked frankfurters in a defined path, applying steam to soften the casing, then slitting the casing of each link and moving said slit links between casing gripping members and moving an intermediate member relative thereto to apply pressure to the side of the links opposite the slit to push the frankfurter filling out of said casing link; to provide such apparatus including spaced rotating discs with serrations on the adjacent faces near the peripheries to engage the casing of a string of links as it passes therebetween and a cam member having a periphery to engage said frankfurter links and push the frankfurter filling from the casing thereof as it is being moved thereover by said discs; to provide such an apparatus wherein the links are fed into a channel of progressively decreasing depth from the inlet to the outlet thereof with means at the sides of the channels to hold the casing whereby the frankfurter filling is forced from the casing as it is moved to the shallow portion of the channel; to provide such an apparatus with a tubular guide for directing the links into the channel path; to provide a steam supply to said tubular guide for heating and softening the casing as the links move therethrough; to provide a knife over the path of the links as they move adjacent the inlet of the channel path for slitting the casing of each link longitudinally thereof; and to provide such an apparatus that is economical to manufacture and efficient in use for removing the casing from frankfurters and the like.

Other objects and advantages of this invention will become apparent from the following description taken in connection with the accompanying drawings wherein are set forth by way of illustration and example certain embodiments of this invention.

Fig. 4 is a vertical sectional view through the apparatus on the line 4—4, Fig. 1.

Fig. 5 is a vertical longitudinal sectional view through the apparatus on the line 5—5, Fig. 2.

Fig. 6 is a partial perspective view of the apparatus.

Figure 1:
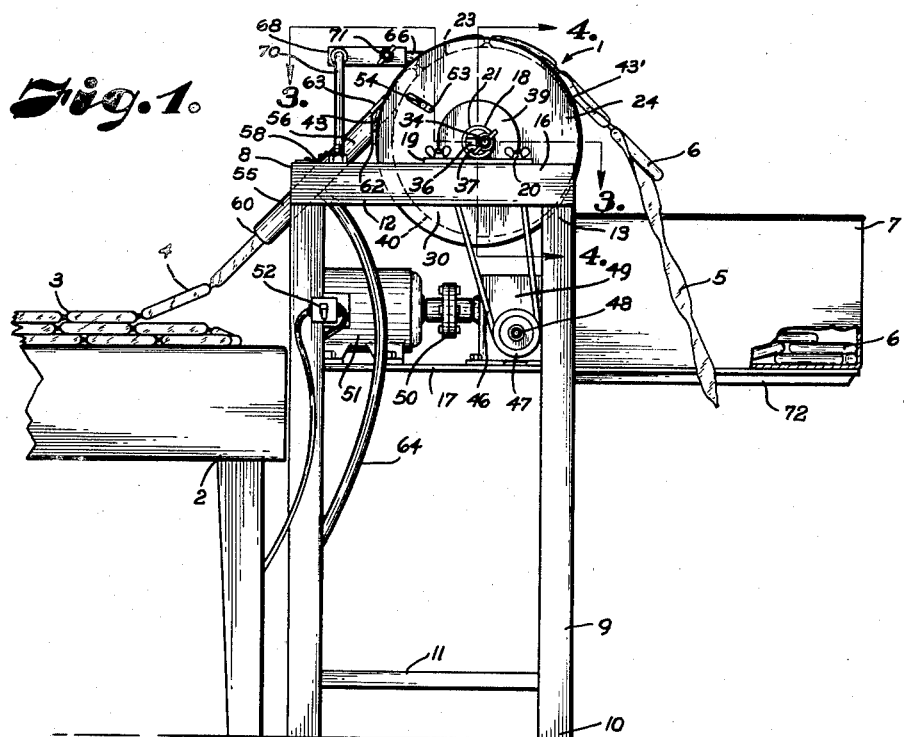
Fig. 1 is a side elevation of apparatus for removing casing from frankfurters and the like in accordance with the present invention.

Referring more in detail to the drawings:

1 designates a frankfurter skinning apparatus preferably arranged adjacent to a table 2 or other support for strings 3 of frankfurter links 4 which are fed to the skinning apparatus for removing the skin 5 from the links whereby the skinless frankfurter filling 6 is discharged into a receptacle 7.

Figure 2:
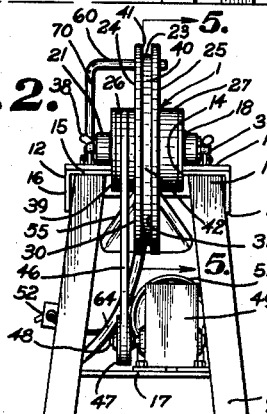
Fig. 2 is an end elevation of the apparatus from the outlet end thereof.
Figure 3:
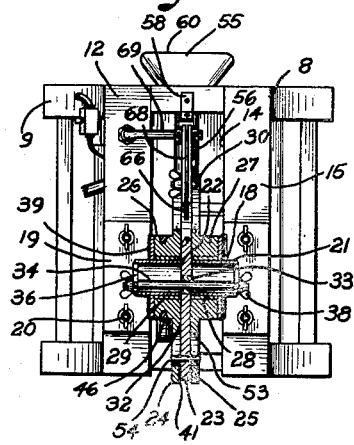
Fig. 3 is a horizontal sectional view through the apparatus on the line 3—3, Fig. 1.

The apparatus 1 includes a support or stand 8 in the form of a frame formed of suitable structural members and having a plurality of spaced legs 9 suitably connected adjacent their lower ends 10 by bracing 11. The legs 9 on opposite sides of the apparatus are preferably inclined upwardly and top members 12 are suitably secured to the upper ends 13 of the legs on each side of the machine whereby said top members extend longitudinally relative to the direction of travel of the frankfurters and are spaced apart as at 14. In the illustrated structure, the top members 12 are each angle shaped in cross-section, with each having a horizontal leg 15 resting on the upper ends of the legs and a vertical leg 16 depending therefrom at the outside of said legs, as illustrated in Fig. 2. The stand 8 preferably has a shelf or platform 17 secured thereto in downwardly spaced relation to the top members 12 to further brace the legs and also serve as a motor support, as later described.

Bearing members 18 are mounted in axial alignment on the stand or support 8 with the axis extending transversely of the direction of travel of the frankfurters. In the illustrated structure, the bearing members 18 are mounted on the top members 12 and preferably each include a plate 19 removably mounted on said top members and secured relative thereto by suitable fastening devices such as bolts 20. The bearing members each include tubular portions 21 suitably secured to the plate members 19 as by welding and extending inwardly therefrom in axially aligned relation with the inner or adjacent ends spaced as at 22 to accommodate an intermediate disc member 23, as later described. Outer disc members 24 and 25 are rotatably mounted on the bearing members 18 for rotation about the axis of the tubular bearing portions 21. The disc members 24 and 25 include hubs 26 and 27 having axial bores 28 in which are mounted bearing members 29 which rotatably engage the tubular bearing portions 21. Annular flange portions 30 extend radially from the inner portions of the hubs with the inner faces 31 of said flanges and hubs being in spaced planes perpendicular to the axis of the tubular bearing portions 21 with the spacing between the surfaces 31 being slightly less than the normal diameter or thickness of a frankfurter to be skinned. The intermediate disc 23 is positioned between the outer disc members 24 and 25 with the opposite faces 32 of said intermediate disc engaging the faces 31 of the outer discs. The intermediate disc has a bearing bushing 33 axially arranged in said intermediate disc and rotatably mounted on a shaft 34 extending through the tubular bearing portions 21, said shaft having reduced ends 35 which extend through horizontal slots 36 in plate members 37 fixed in the outer ends of the tubular bearing portions 21 and the reduced ends 35 of the shaft 34 are preferably threaded and suitable nuts 38 screwed thereon to engage the plate members 37 to fix the shaft 34 relative to the bearing members in offset relation to the axis of the tubular bearing portions 21, as illustrated in Fig. 4. Suitable means, such as flanges 39, are fixed on the tubular bearing portions 21 and adapted to substantially engage the outer faces of the hubs 26 and 27 to hold the outer discs against end play and maintain engagement of the faces 31 thereof with the faces 32 of the intermediate disc. The shaft 34 is offset toward the outlet end of the skinning apparatus, and the disc 23 is smaller in diameter than the flanges 30, and due to the offset relation between the intermediate disc and the outer discs, the periphery 40 of the intermediate disc cooperates with the marginal portions 41 of the inner faces 31 of the outer discs or flanges 30 to define a channel-shaped path 42 that progressively decreases in depth from the inlet portion 43 to the outlet portion 43'. The marginal portions of the inner faces of the outer discs are preferably provided with a plurality of serrations 44 that will tend to grip the casing of a frankfurter as it is moved along the path and hold said casing downwardly in the channel or groove relative to the outer periphery of the flanges 30.

Suitable drive means is provided for the discs and, in the illustrated structure, the hub 26 is provided with a belt groove 45 to operatively connect same by means of a belt 46 to a pulley 47 on a driven shaft 48 of a speed reduction mechanism 49, the drive shaft of which is operatively connected by a flexible coupling 50 to a motor 51 whereby operation of the motor drives the pulley 47 and rotates the outer disc 24. The motor 51, as illustrated, is an electric motor, and under control of a switch 52 to connect the motor to a source of current. The disc members 24 and 25 are preferably provided with radial slots 53 into which ends of a pin 54 fixed on the intermediate disc extend to key the discs together for rotation, the two outer discs being rotated about the axis of the tubular bearing portions 21 and the intermediate disc being rotated about the axis of the shaft 34. The motor 51 and speed reduction unit 49 are both preferably supported on the platform 17 of the stand 8, as illustrated in Fig. 1.

A string of frankfurters is directed into the channel 42 by a guide means 55. In the illlustrated structure, the guide means is a tube 56 having a suitable bore 57 whereby the frankfurters may slide therethrough. The tube 56 is secured by a bracket 58 to a frame member 59 extending across between the upper portion of the stand in spaced relation to the discs at the inlet end thereof. The tube 56 preferably has a wide mouth or inlet opening 60 converging to the bore 57 as at 61, and then the bore is cylindrical to the discharge end 62 of said guide means adjacent the periphery of the outer discs. The tube has an extension 63 on the upper end in the form of a finger that extends into the channel 42 to press the frankfurters into the channel whereby said frankfurters engage the periphery 40 of the intermediate disc. Steam from a suitable source of supply is delivered through a duct 64 to a port 65 in the cylindrical portion of the bore 57 to supply steam to the frankfurters as they are moved therethrough to heat and soften the casing on the frankfurter links.

In order to slit the casing of the frankfurter links at the exposed side as said links are moved through the channel path, a knife 66 is supported over said channel path and centered relative to the width thereof whereby the cutting edge 67 of said knife will slit the casing but not extend into the frankfurter filling. The knife is removably mounted between blocks 68 carried on an arm 69 extending laterally from a post 70 fixed to a top member 12. A bolt 71 preferably extends through the block 68 and an aperture in the knife 66 whereby when the bolt is tightened the blocks are drawn against the knife to secure same in position. However, the bolt provides a mounting whereby the bolt can be loosened and the knife pivoted thereon to adjust same to regulate the depth of the cut of the knife into the frankfurter casing.

In using a structure constructed and assembled as shown and described, a string of frankfurter links is placed on the table 2, the switch 52 operated to energize the motor to drive the speed reduction unit and, in turn, rotate the discs 23, 24 and 25, and steam is supplied to the guide tube 55. The string of frankfurters is then fed into the inlet opening 60 of the guide tube and moved therethrough whereby the leading frankfurter enters the channel path and is pressed downwardly therein until the lower side of the frankfurter engages the periphery of the intermediate disc. The sides of the casing are then engaged by the serrations 44 and rotation of the discs tends to draw the frankfurters through the guide tube 55 and move same through said channel path. As the frankfurters are moved under the knife 66, the upper or exposed side of the casing is slit. As the frankfurters continue to move through the channel path, the depth of which progressively decreases, the serrations 44 hold the slit casing in said channel path, and the periphery of the intermediate disc provides a cam action pushing the frankfurter filling outwardly through the slit in the casing. Since the feed of the frankfurters in the string is continued by the operation of the machine, the operator then moves to the outlet side adjacent the receptacle 7 supported on brackets 72 carried by the stand 8 and directs the skinned frankfurters into the receptacle 7 and the casing removed therefrom to the side of the receptacle, thereby providing the separation of the finished skinned frankfurters from the casing.

It is to be understood that while I have illustrated and described one form of my invention, it is not to be limited to the specific form or arrangement of parts herein described except insofar as such limitations are included in the claims.

What I claim and desire to secure by Letters Patent is:

1. Apparatus for removing the casing from frankfurters and the like in the making of skinless frankfurters comprising, a frame, a pair of spaced discs having substantially parallel adjacent faces, bearing means mounted on said frame and rotatably mounting the spaced discs for axial rotation, an intermediate disc between said spaced discs, means rotatably mounting the intermediate disc for rotation about an axis offset relative to the axis of rotation of the spaced discs whereby the intermediate disc is eccentric to the spaced discs and the periphery thereof cooperates with the adjacent faces of the spaced discs to define a channel-shaped path having an inlet portion and an outlet portion and of progressively decreasing depth from said inlet portion to said outlet portion, means on the adjacent faces of said spaced discs defining the sides of the channel-shaped path and said channel-shaped path being slightly less than the width of the frankfurter links to be fed therebetween whereby the casing of the frankfurter link is engaged and held by said means, means operatively connected with said discs for rotating same about their respective axes, a guide supported on the frame in alignment with the channel-shaped path for directing a string of linked frankfurters into the inlet portion of said channel path and moving the frankfurter links into engagement with the periphery of said intermediate disc as they are moved into the channel-shaped path, means supplying steam to said frankfurter links for heating and softening the casing thereof, and casing slitting means supported adjacent the inlet portion of said channel-shaped path to slit the casing of the frankfurter links at the exposed sides thereof as they move in said channel-shaped path whereby the means holding the slit casing and the intermediate disc cooperate to push the frankfurter filling from the casing as it moves over the shallow portion of the channel path adjacent the outlet portion thereof.

2. Apparatus for removing the casing from frankfurters and the like in the making of skinless frankfurters comprising, a frame having longitudinal upper members spaced laterally relative to each other, a pair of spaced discs positioned between said longitudinal members and having substantially parallel adjacent faces, bearing means mounted on said longitudinal members and rotatably mounting the spaced discs for axial rotation about an axis transversely of said longitudinal members, an intermediate disc between said spaced discs, means rotatably mounting the intermediate disc for rotation about an axis offset relative to the axis of rotation of the spaced discs whereby the intermediate disc is eccentric to the spaced discs and the periphery thereof cooperates with the adjacent faces of the spaced discs to define a channel-shaped path having an inlet portion and an outlet portion and of progressively decreasing depth from said inlet portion to said outlet portion, a plurality of serrations on the adjacent faces of said spaced discs defining the sides of the channel-shaped path and said channel-shaped path being slightly less than the width of the frankfurter links to be fed therebetween whereby the casing of the frankfurter link is engaged and held by said serrations, means operatively connected with said discs for rotating same about their respective axes, a tubular guide supported on the frame in alignment with the channel-shaped path for directing a string of linked frankfurters into the inlet portion of said channel path, means extending into the inlet portion of the channel-shaped path and having a spacing from the periphery of the intermediate disc substantially corresponding to the thickness of a frankfurter link to move the frankfurter links into engagement with the periphery of said intermediate disc as they are moved into the channel-shaped path, means supplying steam to said tubular guide for heating and softening the casing of the frankfurter links as they are fed to said channel-shaped path, and a knife supported adjacent the inlet portion of said channel-shaped path to slit the casing of the frankfurter links at the exposed sides thereof as they move in said channel-shaped path whereby the serrations hold the slit casing at the same relative depth in the channel path and the intermediate member pushes the frankfurter filling from the casing as it moves over the shallow portion of the channel path adjacent the outlet portion thereof.

3. Apparatus for removing the casing from frankfurters and the like in the making of skinless frankfurters comprising, a frame having longitudinal upper members spaced laterally relative to each other, a pair of spaced discs positioned between said longitudinal members and having substantially parallel adjacent faces, bearing means mounted on said longitudinal members and rotatably mounting the spaced discs for axial rotation about an axis transversely of said longitudinal members, an intermediate disc between said spaced discs and having opposite faces engaged with the adjacent faces of said spaced discs, means rotatably mounting the intermediate disc for rotation about an axis offset relative to the axis of rotation of the spaced discs whereby the intermediate disc is eccentric to the spaced discs and the periphery thereof cooperates with the adjacent faces of the spaced discs to define a channel-shaped path having an inlet portion and an outlet portion and of progressively decreasing depth from said inlet portion to said outlet portion, a plurality of serrations on the adjacent faces of said spaced discs defining the sides of the channel-shaped path and extending longitudinally thereof and said channel-shaped path being slightly less than the width of the frankfurter links to be fed therebetween whereby the casing of the frankfurter link is engaged and held by said serrations, means keying the spaced discs and intermediate disc together for rotation about their respective axes, means operatively connected with one of the discs for rotating same, a tubular guide supported on the frame in alignment with the channel-shaped path and terminating adjacent the inlet portion thereof for directing a string of linked frankfurters into the inlet portion of said channel path, a finger-like extension on the tubular guide means extending into the channel-shaped path and having a spacing from the periphery of the intermediate disc substantially corresponding to the thickness of a frankfurter link to move the frankfurter links into engagement with the periphery of said intermediate disc as said frankfurter links are moved into the channel-shaped path, means supplying steam to said tubular guide for heating and softening the casing of the frankfurter links as they are fed to said channel-shaped path, a knife supported adjacent the inlet portion of said channel-shaped path and having a cutting edge centered thereover to slit the casing of the frankfurter links at the exposed sides thereof as they move in said channel-shaped path whereby the serrations hold the slit casing at the same relative depth in the channel path and the intermediate member pushes the frankfurter filling from the casing as it moves over the shallow portion of the channel path adjacent the outlet portion thereof, and means for receiving the skinned frankfurters from the outlet portion of the apparatus.

4. Apparatus for removing the casing from frankfurters and the like in the making of skinless frankfurters comprising, a frame, a pair of spaced discs having substantially parallel adjacent faces, bearing means mounted on said frame and rotatably mounting the spaced discs for axial rotation, an intermediate disc between said spaced discs, means rotatably mounting the intermediate disc for rotation about an axis offset relative to the axis of rotation of the spaced discs whereby the intermediate disc is eccentric to the spaced discs and the periphery thereof cooperates with the adjacent faces of the spaced discs to define a channel shaped path having an inlet portion and an outlet portion and of progressively decreasing depth from said inlet portion to said outlet portion, means on said spaced discs defining the sides of the channel-shaped path for engaging and holding the sides of a casing of a frankfurter link positioned in said channel-shaped path, means operatively connected with said discs for rotating same about their respective axes, means directing a string of linked frankfurters into the inlet portion of said channel-shaped path, and cutting means slitting the casing at the side exposed in said channel-shaped path whereby said means holding the slit casing and the intermediate disc cooperate to remove the frankfurter filling from the casing as it moves toward the outlet portion of the channel-shaped path.

5. Apparatus for removing the casing from frankfurters and the like in the making of skinless frankfurters comprising, a frame, a pair of spaced discs having substantially parallel adjacent faces, bearing means mounted on said frame and rotatably mounting the spaced discs for axial rotation, an intermediate disc between said spaced discs, means rotatably mounting the intermediate disc for rotation about an axis offset relative to the axis of rotation of the spaced discs whereby the intermediate disc is eccentric to the spaced discs and the periphery thereof cooperates with the adjacent faces of the spaced discs to define a channel-shaped path having an inlet portion and an outlet portion and of progressively decreasing depth from said inlet portion of said outlet portion, a plurality of serrations on the adjacent faces of said spaced discs and extending longitudinally of the channel-shaped path for engaging and holding the casing of a frankfurter link positioned in said channel-shaped path, means operatively connected with said discs for rotating same about their respective axes, means directing a string of linked frankfurters into the inlet portion of said channel-shaped path, and a knife supported adjacent the inlet portion of said channel-shaped path and having a cutting edge centered thereover to slit the casing at the exposed side as it moves in said channel-shaped path whereby the serrations hold the slit casing and cooperate with the intermediate disc for removing the frankfurter filling from the casing as it moves toward the outlet portion of the channel-shaped path.

References Cited in the file of this patent

UNITED STATES PATENTS

| | | |
|---|---|---|
| 2,340,755 | Jacobson | Feb. 1, 1944 |
| 2,644,979 | Ball | July 14, 1953 |
| 2,699,570 | Chambers et al. | Jan. 18, 1955 |
| 2,702,404 | Rufenach | Feb. 22, 1955 |